US007764391B2

(12) United States Patent
Tanaka

(10) Patent No.: US 7,764,391 B2
(45) Date of Patent: Jul. 27, 2010

(54) FACSIMILE APPARATUS ALLOWING EASY MANAGEMENT THROUGH EMAIL

(75) Inventor: Hideo Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 2086 days.

(21) Appl. No.: 10/657,097

(22) Filed: Sep. 9, 2003

(65) Prior Publication Data

US 2004/0114179 A1  Jun. 17, 2004

(30) Foreign Application Priority Data

Sep. 10, 2002 (JP) ............................. 2002-263546
Sep. 4, 2003 (JP) ............................. 2003-312578

(51) Int. Cl.
*G06F 15/00* (2006.01)
*H04N 1/00* (2006.01)

(52) U.S. Cl. ........................ 358/1.15; 358/400; 358/402

(58) Field of Classification Search ................ 358/1.15, 358/402, 400, 403, 440, 1.13, 405; 709/206; 455/414.4, 412.1; 340/517, 506; 713/182, 713/200; 345/772
See application file for complete search history.

(56) References Cited

U.S. PATENT DOCUMENTS

| | | | | |
|---|---|---|---|---|
| 5,251,043 | A * | 10/1993 | Hamano et al. | 358/402 |
| 6,230,189 | B1 * | 5/2001 | Sato et al. | 709/206 |
| 6,452,688 | B1 * | 9/2002 | Suzuki | 358/1.15 |
| 6,617,969 | B2 * | 9/2003 | Tu et al. | 340/517 |
| 6,700,674 | B1 * | 3/2004 | Otsuka et al. | 358/1.15 |
| 6,825,955 | B1 * | 11/2004 | Shibata | 358/402 |
| 6,873,841 | B1 * | 3/2005 | Sagar | 455/414.4 |
| 6,952,279 | B1 * | 10/2005 | Iida | 358/1.15 |
| 7,009,725 | B2 * | 3/2006 | Miyanaga | 358/1.15 |
| 2001/0054152 | A1 * | 12/2001 | Nakao et al. | 713/182 |
| 2002/0126319 | A1 | 9/2002 | Hirokawa | |
| 2002/0171681 | A1 * | 11/2002 | Nomura et al. | 345/772 |
| 2003/0081234 | A1 * | 5/2003 | Wiley | 358/1.13 |

FOREIGN PATENT DOCUMENTS

| | | |
|---|---|---|
| JP | 6-315061 | 11/1994 |
| JP | 9-107432 | 4/1997 |
| JP | 10-98606 | 4/1998 |
| JP | 11-103364 | 4/1999 |
| JP | 11-225241 | 8/1999 |
| JP | 2001-94748 | 4/2001 |
| JP | 2002-10046 | 1/2002 |
| JP | 2002-175252 | 6/2002 |

* cited by examiner

*Primary Examiner*—King Y Poon
*Assistant Examiner*—Allen H Nguyen
(74) *Attorney, Agent, or Firm*—Oblon, Spivak, McClelland, Maier & Neustadt, L.L.P.

(57) ABSTRACT

A facsimile apparatus configured to exchange email data via a network includes a system control unit which controls an operation of the facsimile apparatus, a communication management unit which stores communication management information in response to occurrence of a facsimile communication, an address registration unit which registers an email address to which email is transmitted, and a data-format conversion unit which converts the communication management information stored in the communication management unit into data in a text format, wherein the system control unit sends the communication management information in the text format to the email address registered in the address registration unit by email.

10 Claims, 9 Drawing Sheets

FACSIMILE APPARATUS ALLOWING EASY MANAGEMENT THROUGH EMAIL

BACKGROUND OF THE INVENTION

A facsimile apparatus disclosed in Japanese Patent Application Publication No. 2002-10046 is provided with functions for reading data from memory cards carrying the data in the CSV (Comma Separated Value) format, storing the data, updating the stored CSV-format data, and transmitting the data to other communication apparatus. In such a facsimile apparatus, information for use in communication management is printed on a sheet of paper as a report for the purpose of controlling and managing transmission and reception of document data.

The facsimile apparatus shown in the above-identified patent document is configured to read CSV-format data from a memory card, to store the data, and to transmit the stored data to another communication apparatus. This makes it possible to store the data in a memory card through a communication line. As long as communication management information or the like remains to be printed on a sheet of paper to indicate communication status, however, the administrator of facsimile apparatus faces problems in that the management and analysis of communication management information or the like are not so easy.

SUMMARY OF THE INVENTION

It is a general object of the present invention to provide a facsimile apparatus that substantially obviates one or more problems caused by the limitations and disadvantages of the related art.

It is another and more specific object of the invention to provide a facsimile apparatus which provides for easy management and analysis of communication management information or the like.

To achieve these and other advantages in accordance with the purpose of the invention, the invention provides a facsimile apparatus configured to exchange email data via a network, including a system control unit which controls an operation of the facsimile apparatus, a communication management unit which stores communication management information in response to occurrence of a facsimile communication, an address registration unit which registers an email address to which email is transmitted, and a data-format conversion unit which converts the communication management information stored in the communication management unit into data in a text format, wherein the system control unit sends the communication management information in the text format to the email address registered in the address registration unit by email.

According to a preferred embodiment of the invention, the text format is the CSV format.

According to a preferred embodiment of the invention, the system control unit requests the data-format conversion unit to convert the communication management information stored in the communication management unit into data in the text format in response to a detection that transmissions and receptions have occurred more than a predetermined number of times.

According to a preferred embodiment of the invention, the system control unit determines according to a user parameter whether to send the communication management information in the text format to the email address in response to the detection that transmissions and receptions have occurred more than a predetermined number of times.

According to a preferred embodiment of the invention, the system control unit outputs the communication management information on a sheet of paper if the email transmission of the communication management information fails.

According to a preferred embodiment of the invention, only a portion of items of the communication management information are converted into data in the text format, and are sent to the email address registered in the address registration unit by email. Here, the portion of items include at least one of a date of facsimile transmission and/or reception, a time thereof, a destination of facsimile transmission, an originating source of facsimile transmission, a communication mode, a number of pages, communication results, and a user code.

According to a preferred embodiment of the invention, the portion of items are specified by use of a terminal connected to the facsimile apparatus.

According to a preferred embodiment of the invention, the system control unit sends the communication management information in the text format to the email address by email at a specified time.

According to a preferred embodiment of the invention, the system control unit sends the communication management information in the text format to the email address by email when specified conditions are satisfied. Here, the specified conditions are satisfied when a number of facsimile transmissions to a specified address exceeds a predetermined number. Alternatively, the specified conditions are satisfied when a number of facsimile transmissions during specified hours exceeds a predetermined number. The specified conditions may be satisfied when a number of facsimile transmissions longer than a specified communication time exceeds a predetermined number.

According to the invention, the facsimile apparatus configured to exchange email data stores communication management information about facsimile communications, and converts the stored communication management information into a text format such as the CSV format, followed by transmitting the text-format communication management information to the registered email address by email. This provides for the administrator of the facsimile apparatus to easily analyze and control communication management information at the terminal apparatus having the registered email address. A text format such as the CSV format that produces small-size files is used for the email transmission of the communication management information, so that the load on the network for mail transmission and the mail receiving terminal is sustained to a low level.

According to the invention, the stored communication management information is converted into data in the text format for transmission by email in response to a detection that transmissions and receptions have occurred more than a predetermined number of times. This eliminates a need for the facsimile user to attend to transmission operation, thereby further improving user convenience.

According to the invention, the system control unit determines according to a user parameter whether to send the communication management information in the text format to the email address in response to the detection that transmissions and receptions have occurred more than a predetermined number of times. This gives the user a choice as to whether to transmit the communication management information automatically, thereby further improving user convenience.

According to the invention, the system control unit outputs the communication management information on a sheet of paper if the email transmission of the communication management information fails. This insures that the facsimile apparatus administrator will notice and properly handle the communication management information.

According to a preferred embodiment of the invention, only a portion of items of the communication management information are converted into data in the text format, and are sent to the email address registered in the address registration unit by email. This filters out excessive information, thereby reducing the load on the administrator of the facsimile apparatus. Here, the portion of items include at least one of a date of facsimile transmission and/or reception, a time thereof, a destination of facsimile transmission, an originating source of facsimile transmission, a communication mode, a number of pages, communication results, and a user code.

According to the invention, the portion of items are specified by use of a terminal connected to the facsimile apparatus. With this provision, the administrator of facsimile apparatuses does not have to be physically at each facsimile apparatus to operate them, and can specify the items from the terminal of his/her own.

According to the invention, the system control unit sends the communication management information in the text format to the email address by email at a specified time. With this provision, the administrator of facsimile apparatus can manage facsimile apparatuses everyday at a predetermined time.

According to the invention, the system control unit sends the communication management information in the text format to the email address by email when specified conditions are satisfied. With this provision, the administrator of facsimile apparatus can attend to management by concentrating on particular items, thereby further reducing the load on the management work without degrading the quality of management. Here, the specified conditions are satisfied when a number of facsimile transmissions to a specified address exceeds a predetermined number. Alternatively, the specified conditions are satisfied when a number of facsimile transmissions during specified hours exceeds a predetermined number. The specified conditions may be satisfied when a number of facsimile transmissions longer than a specified communication time exceeds a predetermined number.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

First Embodiment

Figure 1:
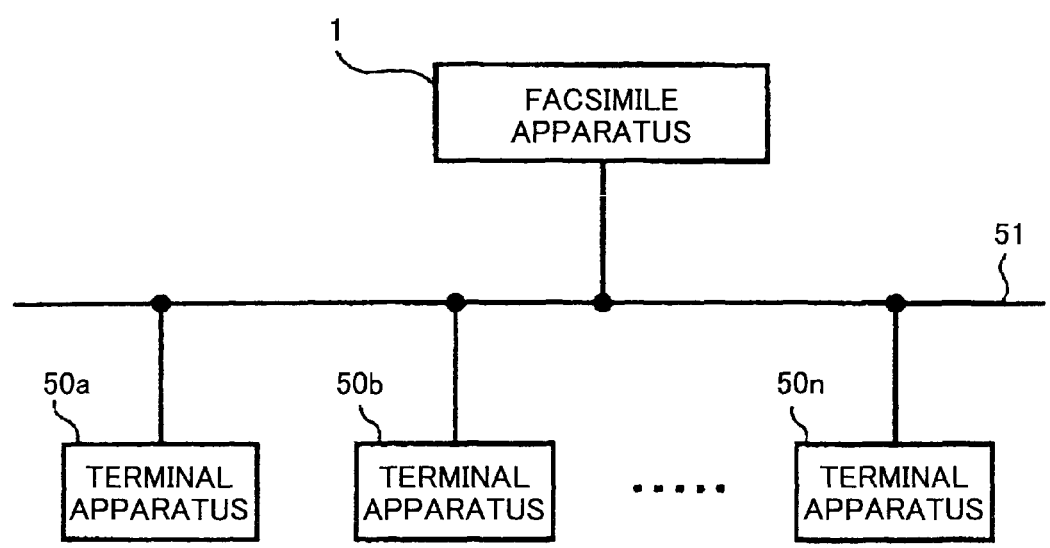
FIG. 1 is a block diagram showing the system configuration of a facsimile apparatus according to an embodiment of the invention.

FIG. 1 is a block diagram showing the system configuration of a facsimile apparatus according to an embodiment of the invention.

With reference to FIG. 1, a facsimile apparatus 1 is connected to a plurality of terminal apparatuses 50a-50n such as personal computers through a communication line 51 such as a local area network.

Figure 2:
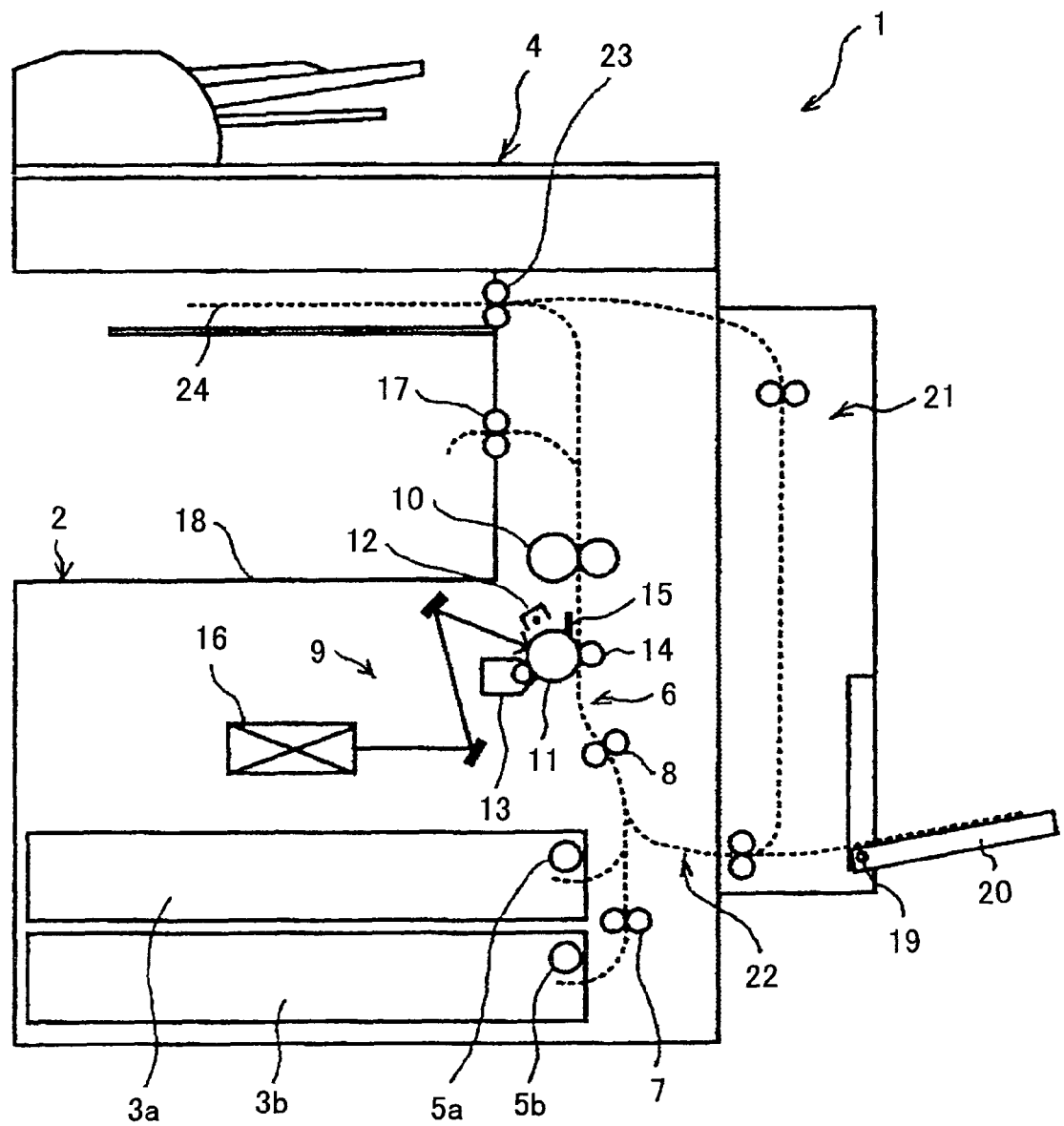
FIG. 2 is an illustrative drawing showing the construction of the facsimile apparatus.

The facsimile apparatus 1 is provided with a copy function and a printer function. As shown in FIG. 2, feeder cassettes 3a and 3b arranged in two decks and containing copy sheets are provided at a lower part of an image forming unit 2, and a scan unit 4 is situated at an upper part of the image forming unit 2.

The feeder cassettes 3a and 3b have feeder rollers 5a and 5b, and eject copy sheets one by one by the feed rollers 5a and 5b from the stack of copy sheets stored in the feed cassettes 3a and 3b. Paths from the feed rollers 5a and 5b merge to form a vertical supply path 6.

Conveyor rollers 7 and 8, an image forming part 9 constituting part of an image forming unit 2, and a fuser unit 10 are arranged along the vertical supply path 6. The image forming part 9 includes a photoconductive drum 11, an electrification charger 12 arranged around the photoconductive drum 11, a developer unit 13, a transfer unit 14, and a cleaning unit 15. An imaging unit 16 is further provided to draw an image by a laser beam on the photoconductive drum 11. The imaging unit 16 includes a laser light source, a polygon mirror, etc.

Ejecting rollers 17 are provided at a downstream end of the vertical supply path 6, and eject copy sheets having images formed thereon to an ejected paper tray 18.

Outside the housing on the side where the vertical supply path 6 is situated, a manual feeder tray 20 is provided that swings around a pivot 19 to move between open and closed positions. On the side of image forming unit 2 and above the pivot 19, a feeding inlet is provided for receiving sheets of paper that are supplied manually. A shared conveyor path 22 for shared use by a double-side-print unit 21 and the manual feeder is provided, and merges with the vertical supply path 6 at a position upstream to the conveyor roller 8. With this provision, manual feeding is available by opening and setting the manual feeder tray 20 in a horizontal position, with a copy sheet set on the manual feeder tray 20 being supplied to the vertical supply path 6 through the shared conveyor path 22.

A copy sheet supplied from the feeder unit 3a or 3b or the manual feeder tray 20 is conveyed to the image forming part 9. In the image forming part 9, the developer unit 13 develops an electrostatic latent image formed on the photoconductive drum 11 by the imaging unit 16, and the transfer unit 14 transfers the developed image onto the copy sheet. The fuser unit 10 applies heat and a pressure to the transferred image on the copy sheet, resulting in the image being fixed on the copy sheet.

The copy sheet having the image fixed thereon is ejected by ejecting rollers 17 onto the ejected paper tray 17.

The double-side-print unit 21 is provided on the exterior of the facsimile apparatus. When images are to be printed on both sides of a copy sheet, a copy sheet with an image printed on one side is sent by conveyor rollers 23 to a switchback path 24 situated at an upper part of the facsimile apparatus. The copy sheet is then supplied from the switchback path 24 to the vertical supply path 6 through the double-side-print unit 21.

Figure 3:
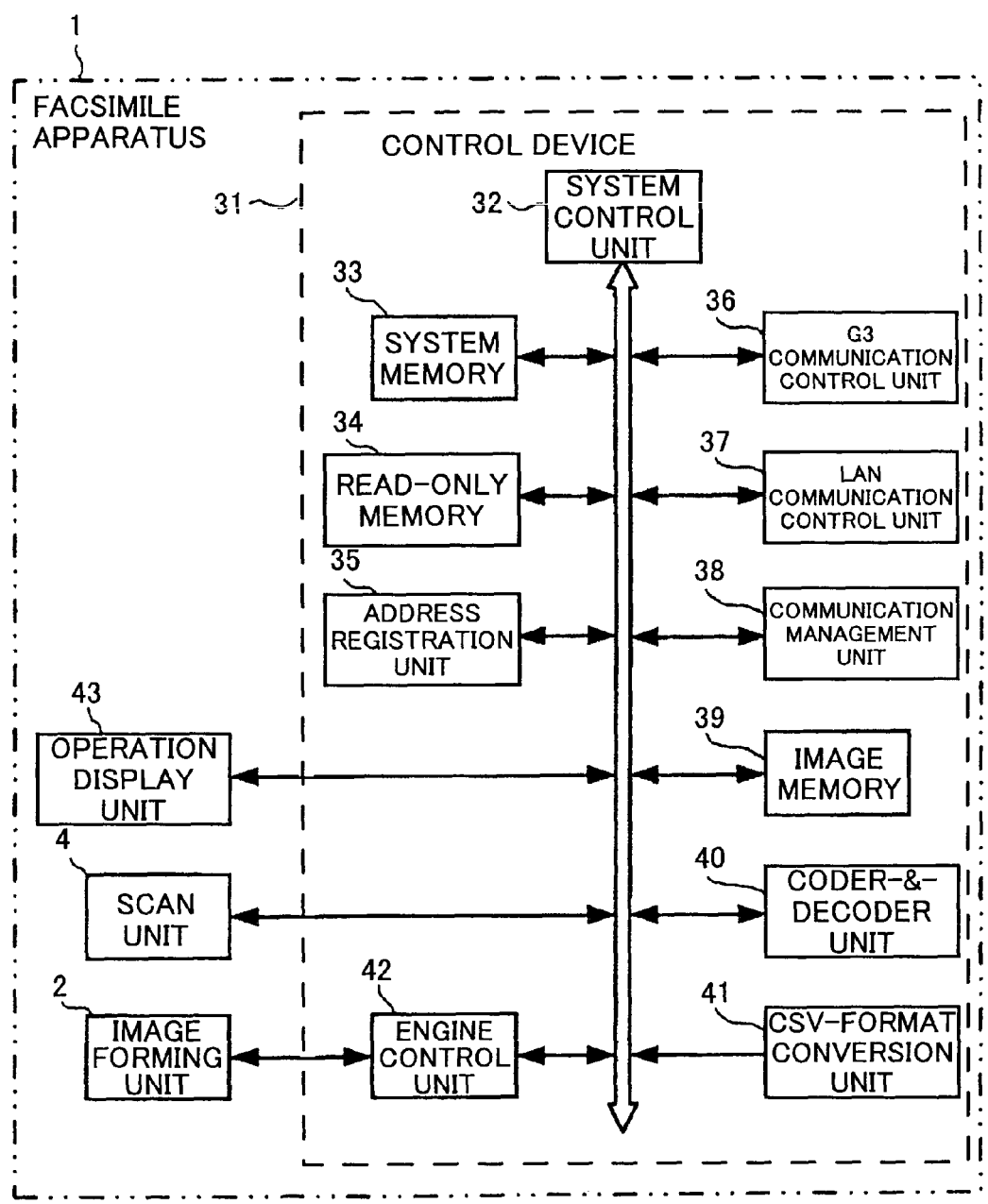
FIG. 3 is a block diagram of the facsimile apparatus relevant to the control of the apparatus.

The facsimile apparatus 1 includes a control device 31 as shown in the block diagram of FIG. 3. The control device 31 includes a system control unit 32, a system memory 33, a read-only memory 34, an address registration unit 35, a G3 communication control unit 36, a LAN communication control unit 37, a communication management unit 38, an image memory 39, a coder-&-decoder unit 40, a CSV-format conversion unit 41, and an engine control unit 42.

The system control unit 32 controls the operation of the entirety of the facsimile apparatus 1, and performs a facsimile transmission control procedure and the like. The system memory 33 is used as a work area for storing data that are necessary when the system control unit 32 executes control programs. The read-only memory 34 stores the control programs and various control data.

The address registration unit 35 registers data indicative of E-mail addresses, to which the LAN communication control unit 37 transmits data. The G3 communication control unit 36 attends to facsimile communication through a public circuit network. The LAN communication control unit 37 communicates with a mail destination through a communication line 51 such as a local area network. The communication management unit 38 controls and manages information that is used for generating communication management reports at the time of facsimile transmission and reception.

The image memory 39 stores images to be transmitted or received. The coder-&-decoder unit 40 compresses image data, and decompresses the compressed image data.

The CSV-format conversion unit 41 attends to conversion into the CSV format by referring to the communication management information controlled by the communication management unit 38. The function of the CSV format is to exchange data that is created with spreadsheet software, database software, etc. This format provides a simple text file that has its cells and fields delimited by commas and records delimited by carriage-return codes. For example, if a record is comprised of a date, a time, an address, a mode, a communication time, a page, and results, the format provides "9. DEC., 6:15, Tokyo Ricoh, G3ES, 0.45, P.3, O.K. • • carriage-return code".

The engine control unit 42 controls the operation of the image forming unit 2.

Figure 4:
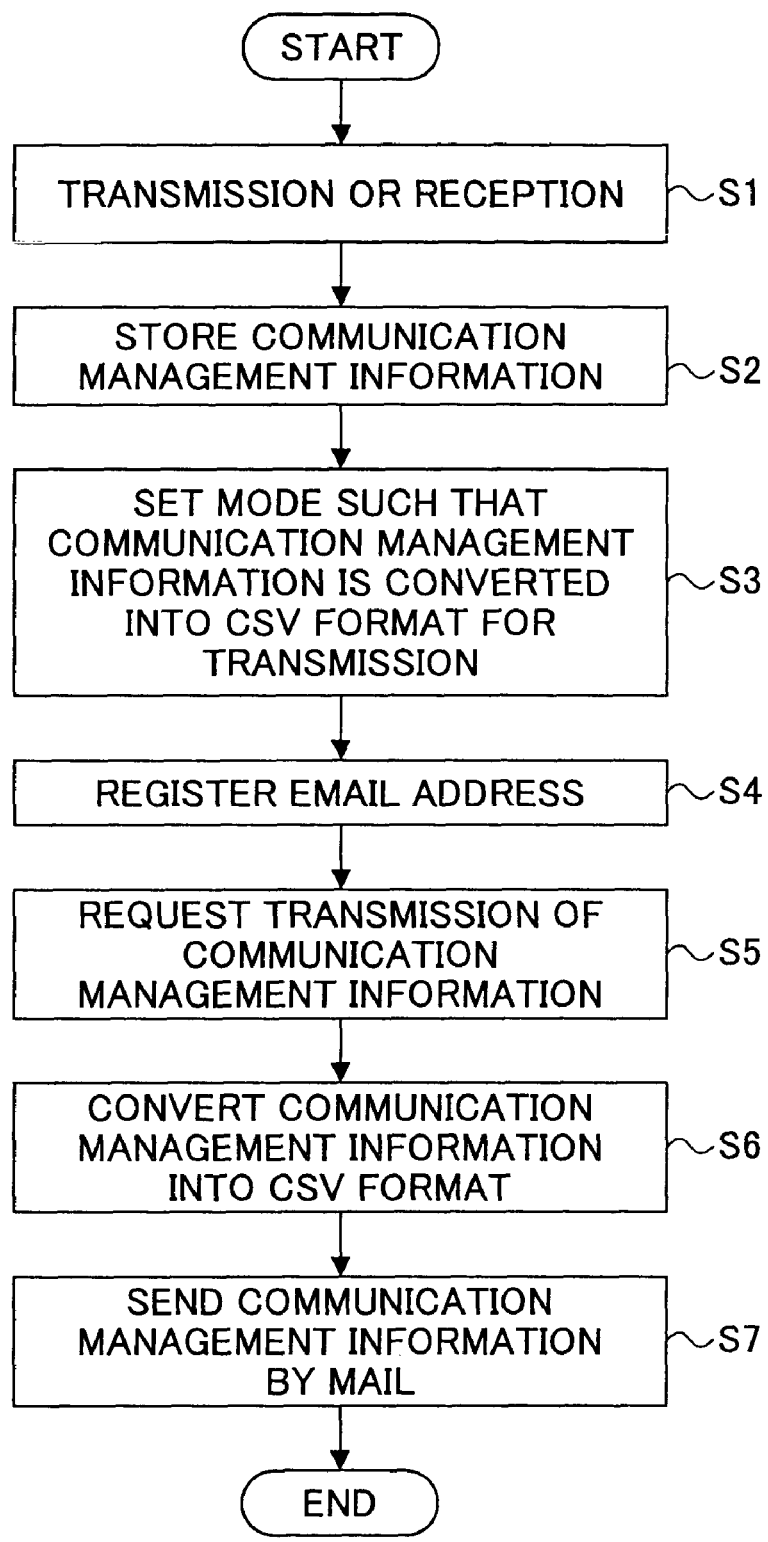
FIG. 4 is a flowchart of the process of outputting communication management information.

In the following, a desription will be given of a process of outputting communication management information performed by the facsimile apparatus 1 of FIG. 1 at the time of facsimile transmission and reception. FIG. 4 is a flowchart of the process of outputting communication management information.

With reference to FIG. 4, the facsimile apparatus 1 attends to transmission or reception by facsimile communication (step S1). The system control unit 32 then registers communication management information in the communication management unit 38 (step S2).

An operation display unit 43 sets a mode by which communication management information is converted into the CSV format for transmission (step S3). A destination to which the communication management information is to be sent by mail, e.g., the mail address of a terminal apparatus 50a, is entered and registered in the address registration unit 35 (step S4). Transmission of the communication management information is then ordered (step S5). In response, the system control unit 32 requests that the CSV conversion unit 41 convert the communication management information into the CSV format.

The CSV conversion unit 41 converts the communication management information stored in the communication management unit 38 into the CSV format (step S6). The system control unit 32 transmits the CSV-format communication management information to the terminal apparatus 50a through the LAN control unit 37 (step S7).

In this manner, the facsimile apparatus 1 of this embodiment converts communication management information into the CSV format for transmission to the terminal apparatus 50a by mail. This provides for the administrator of the facsimile apparatus to easily analyze and control communication management information at the terminal apparatus 50a by use of software such as spreadsheet.

Second Embodiment

Figure 5:
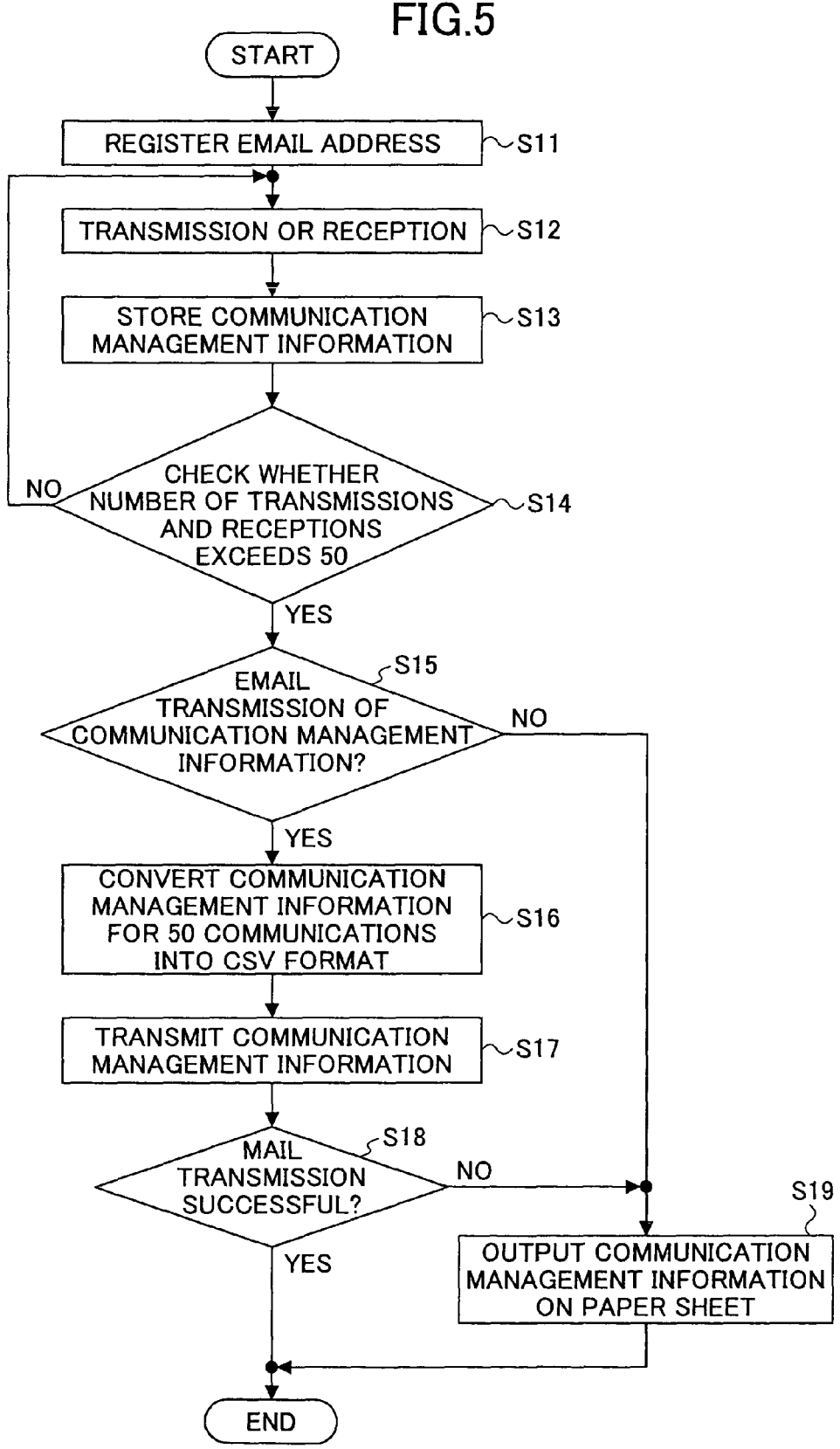
FIG. 5 is a flowchart of the operation of the facsimile apparatus according to a second embodiment.

In the description provided above, the operation display unit 43 orders the transmission of communication management information, and, then, the communication management information stored in the communication management unit 38 is converted into the CSV format for transmission by email. In the following, a description will be given of the operation of the facsimile apparatus according to a second embodiment in which communication management information is automatically converted into the CSV format for transmission by email after the number of facsimile transmissions and receptions exceeds a predetermined number. FIG. 5 is a flowchart of the operation of the facsimile apparatus according to a second embodiment.

With reference to FIG. 5, the terminal apparatus 50n, for example, is registered in the address registration unit 35 as an E-mail destination address by use of the operation display unit 43 (step S11).

Then, transmission or reception is made via facsimile communication (step S12), whereby communication management information is stored in the communication management unit 38 (step S13).

In this embodiment, a check is made as to whether the total number of transmissions and receptions exceeds 50 after repeated transmissions and receptions via facsimile communication (step S14). If it does, the system control unit 32 checks whether it is arranged for the communication management information to be transmitted by E-mail (step S15).

If the check finds that E-mail transmission is arranged for the communication management information, the system control unit 32 requests that the CSV conversion unit 41 convert the communication management information into the CSV format, and the CSV conversion unit 41 converts the communication management information stored in the communication management unit 38 into the CSV format (step S16) where the communication management information is equal in amount to 50 communications.

Further, the system control unit 32 transmits the CSV-format communication management information equal in amount to 50 communications to the terminal apparatus 50n by mail through the LAN control unit 37 (Step S17).

Upon successful transmission of E-mail, the system control unit 32 brings the transmission of communication management information to its end (step S18).

If E-mail transmission is not arranged for the communication management information, and if the E-mail transmission did not succeed, the system control unit 32 transmits the communication management information for 50 communications stored in the communication management unit 38, so that the information is sent to the image forming unit 2 through the engine control unit 42, resulting in the information being printed on a copy sheet (step S19).

In this manner, this embodiment automatically converts communication management information into the CSV format when the number of transmissions and receptions exceeds a predetermined number, followed by transmitting the information by E-mail. This reduces labor required for user operations on the facsimile machine at the time of transmission. Moreover, the user can choose whether to transmit the communication management information automatically, which improves user convenience. Furthermore, the communication management information is printed on a copy sheet for output when the E-mail transmission fails. This embodiment thus allows the user to notice the communication management information without a failure.

Third Embodiment

Figure 6:
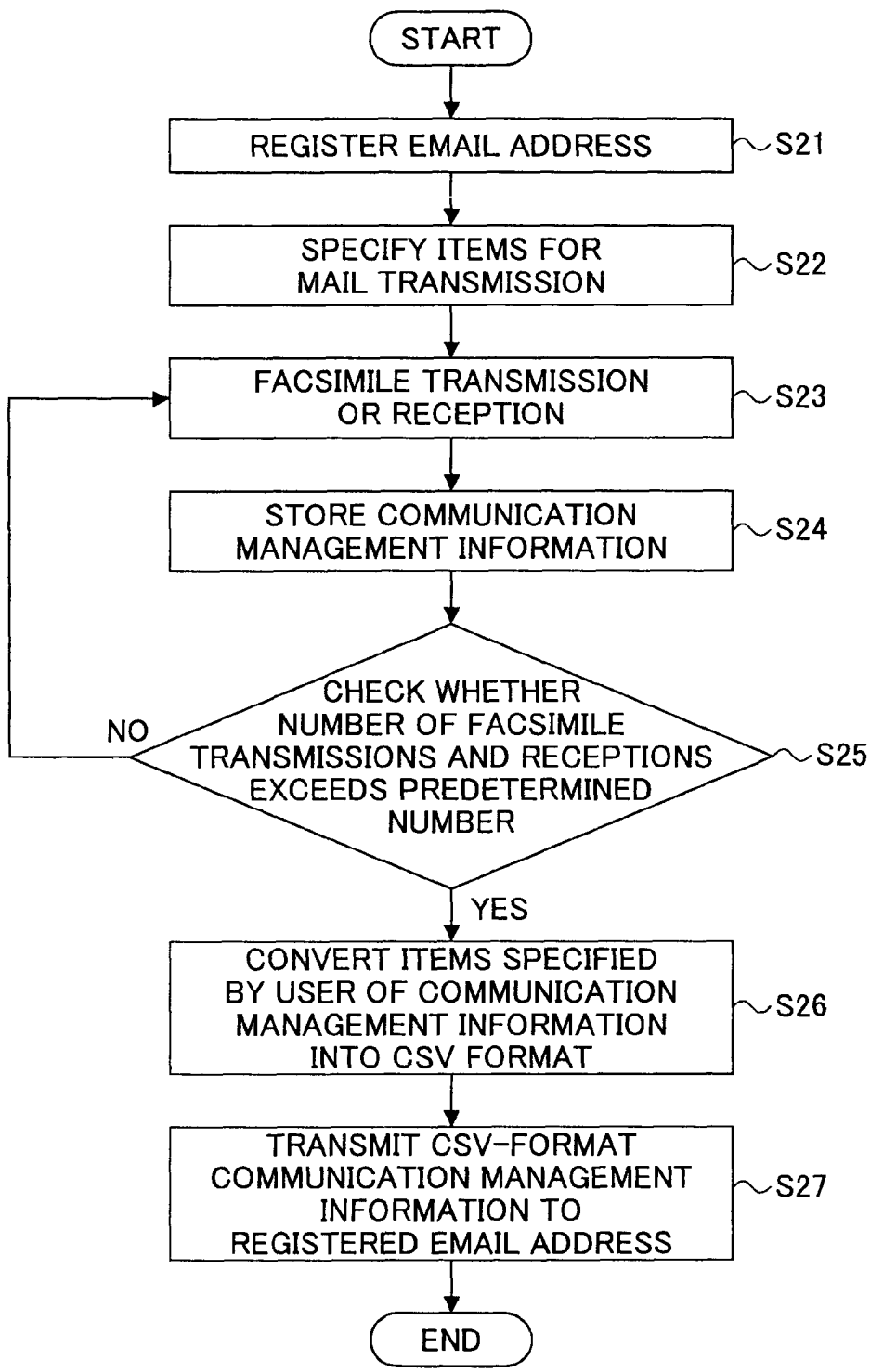
FIG. 6 is a flowchart showing a process performed by the facsimile apparatus according to a third embodiment of the invention.

FIG. 6 is a flowchart showing a process performed by the facsimile apparatus according to a third embodiment of the invention.

With reference to FIG. 6, the E-mail address of the facsimile apparatus administrator to whom communication management information is transmitted is registered in the address registration unit 35. At step S22, some items of the communication management information are specified as ones that need to be transmitted to the administrator via E-mail. Such items include a date of facsimile transmission or reception, a time, a destination or originating source of facsimile transmission, a transmission mode, the number of pages, communication results, and a user code for use in identifying users.

Each time facsimile transmission or reception is detected at step S23, communication management information is stored in the memory of the communication management unit 38 at step S24.

The steps S23 and S24 are repeated. If a check at step S25 finds that the number of repetitions of steps S23 and S24 exceeds a predetermined number, a procedure goes to step S26, at which only the specified items of the communication management information as described above are converted into the CSV format by the CSV conversion unit 41.

At step S27, the items specified by the communication management unit 38 are transmitted to the administrator's E-mail address as an E-mail message.

According to this embodiment, the load of management on the administrator of facsimile apparatus is further reduced.

Fourth Embodiment

Figure 7:
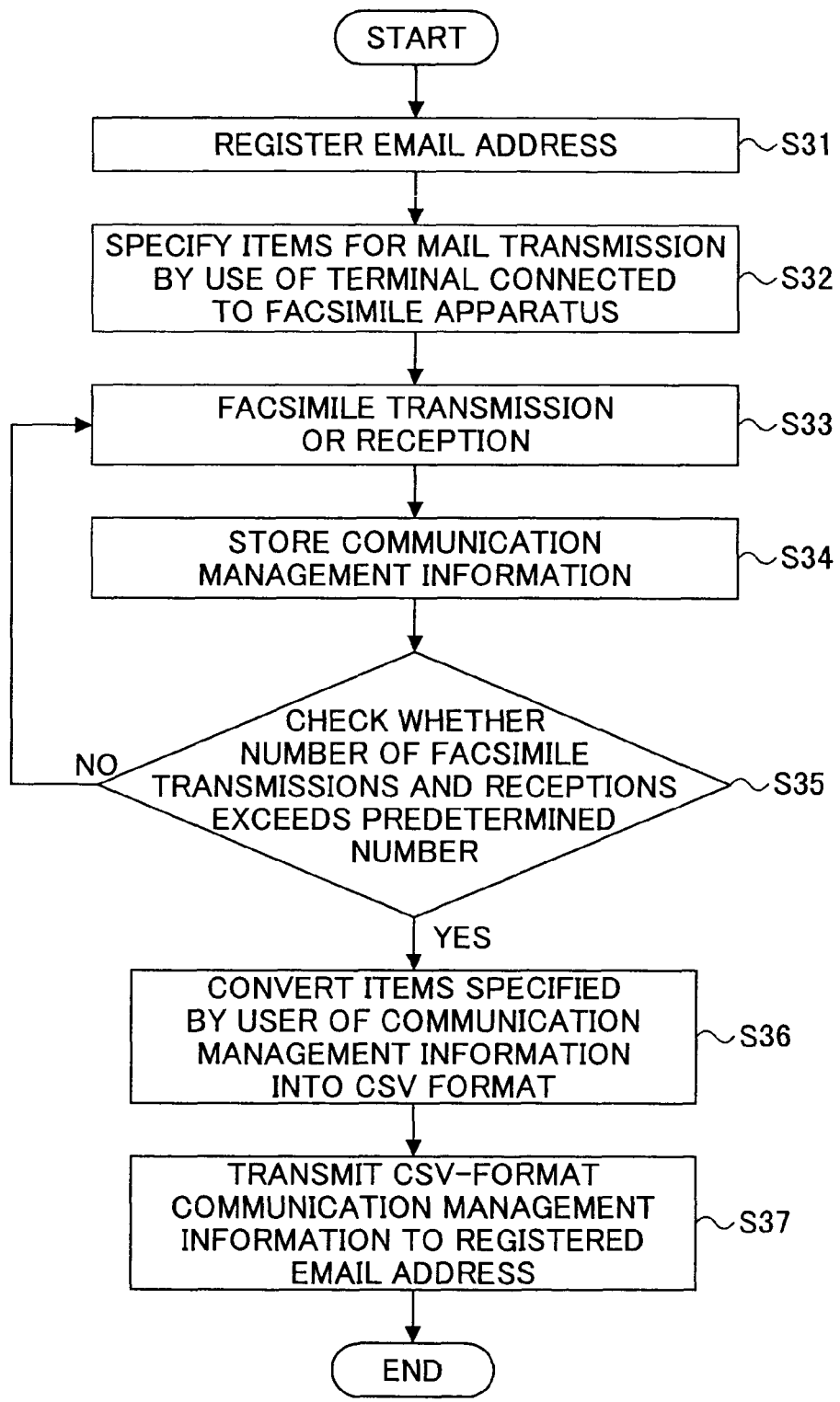
FIG. 7 is a flowchart showing a process performed by the facsimile apparatus according to a fourth embodiment of the invention.

FIG. 7 is a flowchart showing a process performed by the facsimile apparatus according to a fourth embodiment of the invention.

In FIG. 7, at step S31, the E-mail address of the facsimile apparatus administrator to whom communication management information is transmitted is registered in the address registration unit 35 as in step S21 described above. At step S32 of this embodiment, some items of the communication management information are specified by use of a terminal connected to the facsimile apparatus as items that need to be transmitted to the administrator via E-mail. This terminal includes a terminal used by the administrator. The items described above include a date of facsimile transmission or reception, a time, a destination or originating source of facsimile transmission, a transmission mode, the number of pages, communication results, and a user code for use in identifying users.

Each time facsimile transmission or reception is detected at step S33 that corresponds to step S23 previously described, communication management information is stored in the memory of the communication management unit 38 at step S34, which corresponds to step S24 as previously described.

The steps S33 and S24 are repeated as in the preceding embodiment. If a check at step S35 equivalent to above-described step S25 finds that the number of repetitions of steps S33 and S34 exceeds a predetermined number, a procedure goes to step S36, at which only the specified items of the communication management information as described above are converted into the CSV format by the CSV conversion unit 41.

At step S37, which is a counterpart of step S27 of the previous embodiment, the items specified by the communication management unit 38 are transmitted to the administrator's E-mail address as an E-mail message.

According to this embodiment, not only the load of management is reduced on the administrator of the facsimile apparatus, but also the administrator can specify the items on a remote-access basis by use of his/her own terminal. The administrator is thus not required to be physically at each facsimile apparatus to operate them. Especially when the administrator needs to manage a large number of facsimile apparatuses, the load on the administrator will thus be further reduced.

Fifth Embodiment

Figure 8:
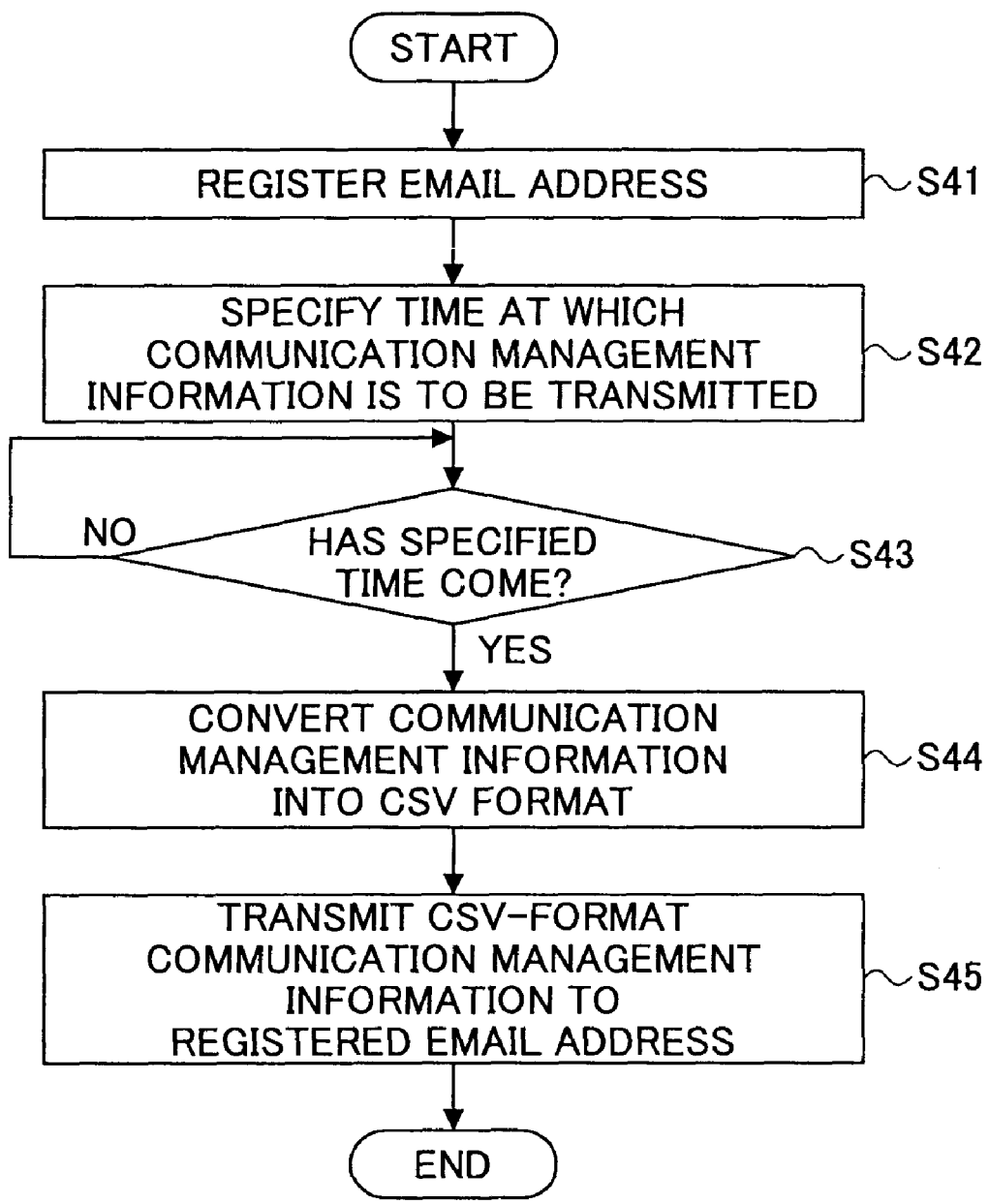
FIG. 8 is a flowchart showing a process performed by the facsimile apparatus according to a fifth embodiment of the invention.

FIG. 8 is a flowchart showing a process performed by the facsimile apparatus according to a fifth embodiment of the invention.

In FIG. 8, at step S41, the E-mail address of the facsimile apparatus administrator to whom communication management information is transmitted is registered in the address registration unit 35 as in step S21 previously described. At step S42 of this embodiment, the time at which communication management information is transmitted to the administrator via E-mail is specified.

At step S43, a check is made as to whether the time has come when the present time is equal to the specified time. If the check result is "YES", specified items of the communication management information are converted into the CSV-format data at step S44 as in step S26 of the previous embodiment. At step S45, the data is transmitted to the administrator by E-mail.

According to the invention, the administrator of the facsimile apparatus receives communication management information by E-mail everyday at a specified time. This provides for the administrator to manage the facsimile apparatus at the specified time of the day.

Sixth Embodiment

Figure 9:
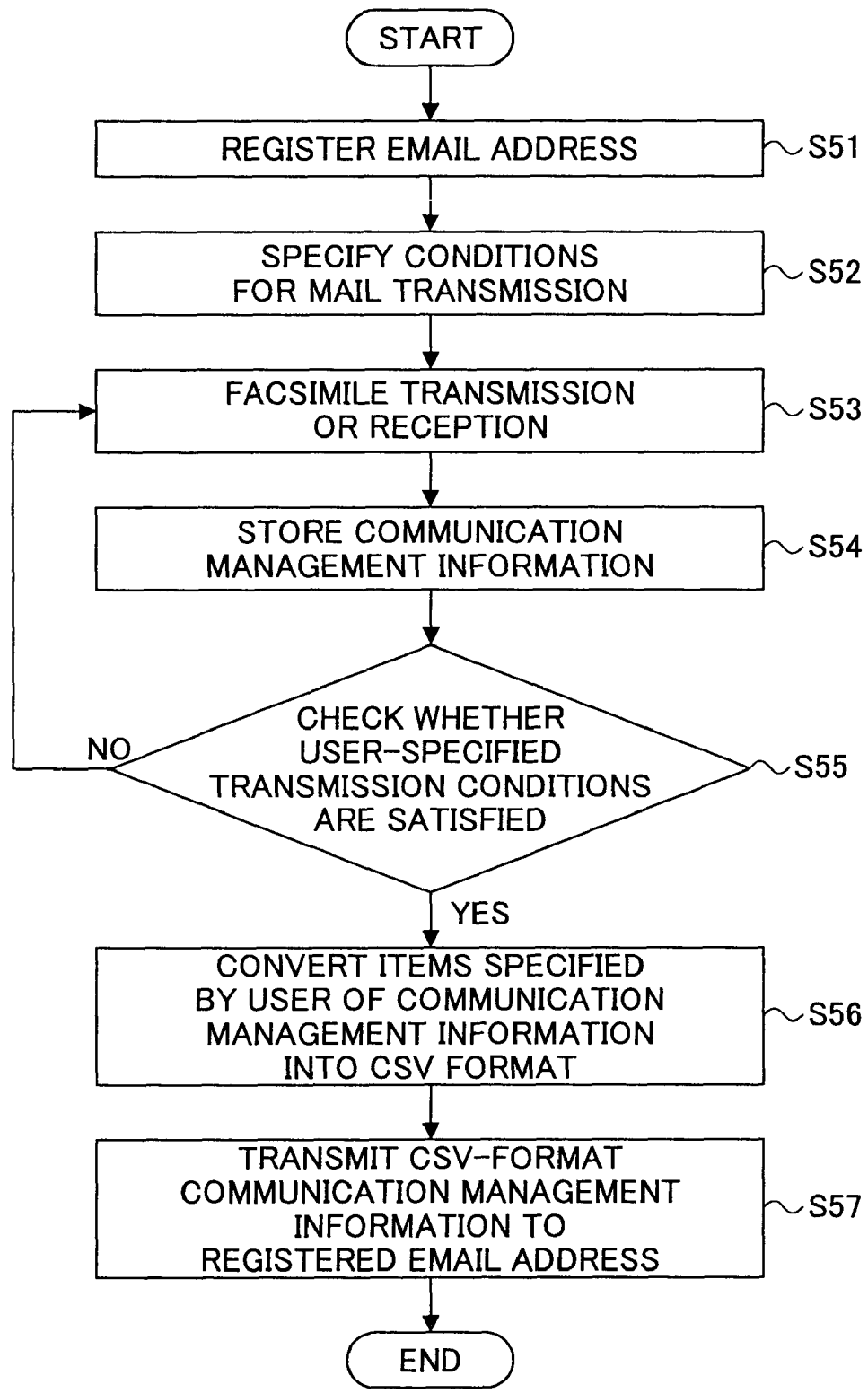
FIG. 9 is a flowchart showing a process performed by the facsimile apparatus according to a sixth embodiment of the invention.

FIG. 9 is a flowchart showing a process performed by the facsimile apparatus according to a sixth embodiment of the invention.

In FIG. 9, at step S51, the E-mail address of the facsimile apparatus administrator to whom communication management information is transmitted is registered in the address registration unit 35 as in step S21 previously described. At step S52, conditions that initiate the transmission of communication management information to the administrator are specified. Such conditions include the maximum number of facsimile transmissions to a particular address, the maximum number of facsimile transmissions during particular hours, the maximum number of facsimile transmissions longer than a specified communication time, etc.

Each time facsimile transmission or reception is detected at step S53, which corresponds to step S23 previously described, communication management information is stored in the memory of the communication management unit 38 at step S54, corresponding to step S24.

The steps S53 and S54 are repeated. At step S55 corresponding to step S25, a check is made as to whether the conditions specified at step S52 are satisfied.

If the check at step S55 produces an answer "YES", a procedure for controlling the facsimile apparatus goes to step S56 corresponding to step S26, at which only the specified items of the communication management information as described above are converted into the CSV format by the CSV conversion unit 41.

At step S57 corresponding to step S27 previously described, the items specified by the communication management unit 38 are transmitted to the administrator's E-mail address as an E-mail message.

According to this embodiment, the administrator of the facsimile apparatus can receive a warning about the usage of the facsimile apparatus as such a need arises, and can thus be able to attend to the matter.

Further, the present invention is not limited to these embodiments, but various variations and modifications may be made without departing from the scope of the present invention.

The present application is based on Japanese priority application No. 2002-263546 filed on Sep. 10, 2002, with the Japanese Patent Office, the entire contents of which are hereby incorporated by reference.

What is claimed is:

1. A facsimile apparatus configured to exchange email data via a network, comprising:
   a system control unit which controls an operation of the facsimile apparatus;
   a communication management unit which stores communication management information in response to occurrence of a facsimile communication;
   an address registration unit which registers an email address to which email is transmitted; and
   a data-format conversion unit which converts the communication management information stored in said communication management unit into data in a text format, wherein
   said system control unit sends the communication management information in the text format to the email address registered in said address registration unit by email when a number of facsimile transmissions to a specified address exceeds a predetermined number, and
   the text format is the CSV format.

2. The facsimile apparatus as claimed in claim 1, wherein said system control unit requests said data-format conversion unit to convert the communication management information stored in said communication management unit into data in the text format in response to a detection that transmissions and receptions have occurred more than a predetermined number of times.

3. The facsimile apparatus as claimed in claim 2, wherein said system control unit determines according to a user parameter whether to send the communication management information in the text format to the email address in response to the detection that transmissions and receptions have occurred more than a predetermined number of times.

4. The facsimile apparatus as claimed in claim 1, wherein said system control unit outputs the communication management information on a sheet of paper if the email transmission of the communication management information fails.

5. The facsimile apparatus as claimed in claim 1, wherein only a portion of items of the communication management information are converted into data in the text format, and are sent to the email address registered in said address registration unit by email.

6. The facsimile apparatus as claimed in claim 5, wherein said portion of items include at least one of a date of facsimile transmission and/or reception, a time thereof, a destination of facsimile transmission, an originating source of facsimile transmission, a communication mode, a number of pages, communication results, and a user code.

7. The facsimile apparatus as claimed in claim 5, wherein the portion of items are specified by use of a terminal connected to said facsimile apparatus.

8. The facsimile apparatus as claimed in claim 1, wherein said system control unit sends the communication management information in the text format to the email address by email at a specified time.

9. A facsimile apparatus configured to exchange email data via a network, comprising:
   a system control unit which controls an operation of the facsimile apparatus;
   a communication management unit which stores communication management information in response to occurrence of a facsimile communication;
   an address registration unit which registers an email address to which email is transmitted; and
   a data-format conversion unit which converts the communication management information stored in said communication management unit into data in a text format, wherein
   said system control unit sends the communication management information in the text format to the email address registered in said address registration unit by email when a number of facsimile transmissions during specified hours exceeds a predetermined number, and
   the text format is the CSV format.

10. A facsimile apparatus configured to exchange email data via a network, comprising:
    a system control unit which controls an operation of the facsimile apparatus;
    a communication management unit which stores communication management information in response to occurrence of a facsimile communication;
    an address registration unit which registers an email address to which email is transmitted; and
    a data-format conversion unit which converts the communication management information stored in said communication management unit into data in a text format, wherein
    said system control unit sends the communication management information in the text format to the email address registered in said address registration unit by email when a number of facsimile transmissions longer than a specified communication time exceeds a predetermined number, and
    the text format is the CSV format.

* * * * *